(12) United States Patent
Ver Hage

(10) Patent No.: US 6,766,768 B1
(45) Date of Patent: Jul. 27, 2004

(54) ANIMAL CAGE WITH WIRE BAR LID

(75) Inventor: Richard P. Ver Hage, North Haledon, NJ (US)

(73) Assignee: Ver Hage Enterprises, Midland Park, NJ (US)

( * ) Notice: Subject to any disclaimer, the term of this patent is extended or adjusted under 35 U.S.C. 154(b) by 0 days.

(21) Appl. No.: 10/453,856

(22) Filed: Jun. 3, 2003

Related U.S. Application Data (60) Provisional application No. 60/384,972, filed on Jun. 3, 2002.

(51) Int. Cl.[7] .................. A01K 31/06; A01K 39/01; A01K 1/03
(52) U.S. Cl. .................. 119/456; 119/475; 119/452
(58) Field of Search .................. 119/456, 455, 119/452, 464, 470, 475, 482; D30/114, 116

(56) References Cited

U.S. PATENT DOCUMENTS

| | | | | |
|---|---|---|---|---|
| 3,381,665 A | * | 5/1968 | Naturale | 119/475 |
| 3,572,293 A | * | 3/1971 | Schroen | 119/475 |
| 3,699,925 A | * | 10/1972 | Van Dongen | 119/475 |
| 3,951,105 A | * | 4/1976 | Mehn | 119/475 |
| 4,763,607 A | * | 8/1988 | Tominaga | 119/452 |
| 5,165,362 A | | 11/1992 | Sheaffer et al. | 119/452 |
| 5,311,836 A | | 5/1994 | Sheaffer et al. | 119/419 |
| 5,996,535 A | * | 12/1999 | Semenuk et al. | 119/456 |

* cited by examiner

Primary Examiner—Charles T. Jordan
(74) Attorney, Agent, or Firm—Sofer & Haroun, LLP (57) ABSTRACT

The present invention relates to an animal cage for containing animals having a wire bar lid configured to fit on top. The wire bar lid has a perimeter portion with a first support portion and a second portion. The first support portion has a first top side and a first bottom side. The second inner portion has a second top side and a second bottom side. A plurality of longitudinal wire bars are also provided where the longitudinal wire bars are connected directly to the second bottom side of the second inner portion of the perimeter portion in a single welding procedure.

43 Claims, 6 Drawing Sheets

ANIMAL CAGE WITH WIRE BAR LID

This application claims the benefit of Provisional Application No. 60/384,972, filed Jun. 3, 2002.

FIELD OF THE INVENTION

The present invention relates to an animal cage. The present invention further relates to an animal cage having a wire bar lid.

BACKGROUND OF THE INVENTION

Animal cages for maintaining laboratory animals used for various types of experimentation or pet care are well known in the art. Wire bar lids for cages are designed to allow for ventilation and also to provide a means for feeding the animals without removing the cage lids.

In order to prevent cross contamination between animals in cages which are in close proximity to one another a filter bonnet is usually placed on top of the cage wire bar lid. Thus, at the meeting point between the cage or plastic container, the filter bonnet and the wire bar lid there is an area of the cages where dirt and other contaminants can collect. Contamination in this area is particularly troublesome when conducting scientific experiments which require sterile environments. This is in addition to the added nuisance of cleaning a large number of cages between experiments.

Another disadvantage associated with standard wire bar lids for animal cages is that they are difficult to manufacture which adds costs to their production. This added cost can be significant, particularly in laboratory settings where a large number of wire lid covers are necessary.

Thus, there exists a need in the field of animal cages, particularly cages for use with laboratory animals, for a wire bar lid that is not only easy and inexpensive to make, but also has a construction that reduces the total area where contaminants can collect at the meeting point of the cage, filter bonnet and wire bar lid.

SUMMARY OF THE INVENTION

The present invention overcomes the drawbacks associated with the prior art and provides an animal cage having a wire bar lid which is easy and inexpensive to make and also reduces the area where contaminants can collect.

The present invention is directed to an animal cage comprising a cage for containing animals and a wire bar lid. The wire bar lid is configured to fit on top of the cage, where the wire bar lid has a perimeter portion having a first support portion and a second inner portion. The first support portion has a first top side and a first bottom side. The second inner portion has a second top side and a second bottom side. A plurality of longitudinal wire bars are connected directly to the second bottom side of the second inner portion of the perimeter portion in a single welding procedure.

BRIEF DESCRIPTION OF THE DRAWINGS

FIG. 6 illustrates a side elevation cross-section of a cage, filter bonnet and wire bar lid, of the present invention.

DETAILED DESCRIPTION

Figure 1:
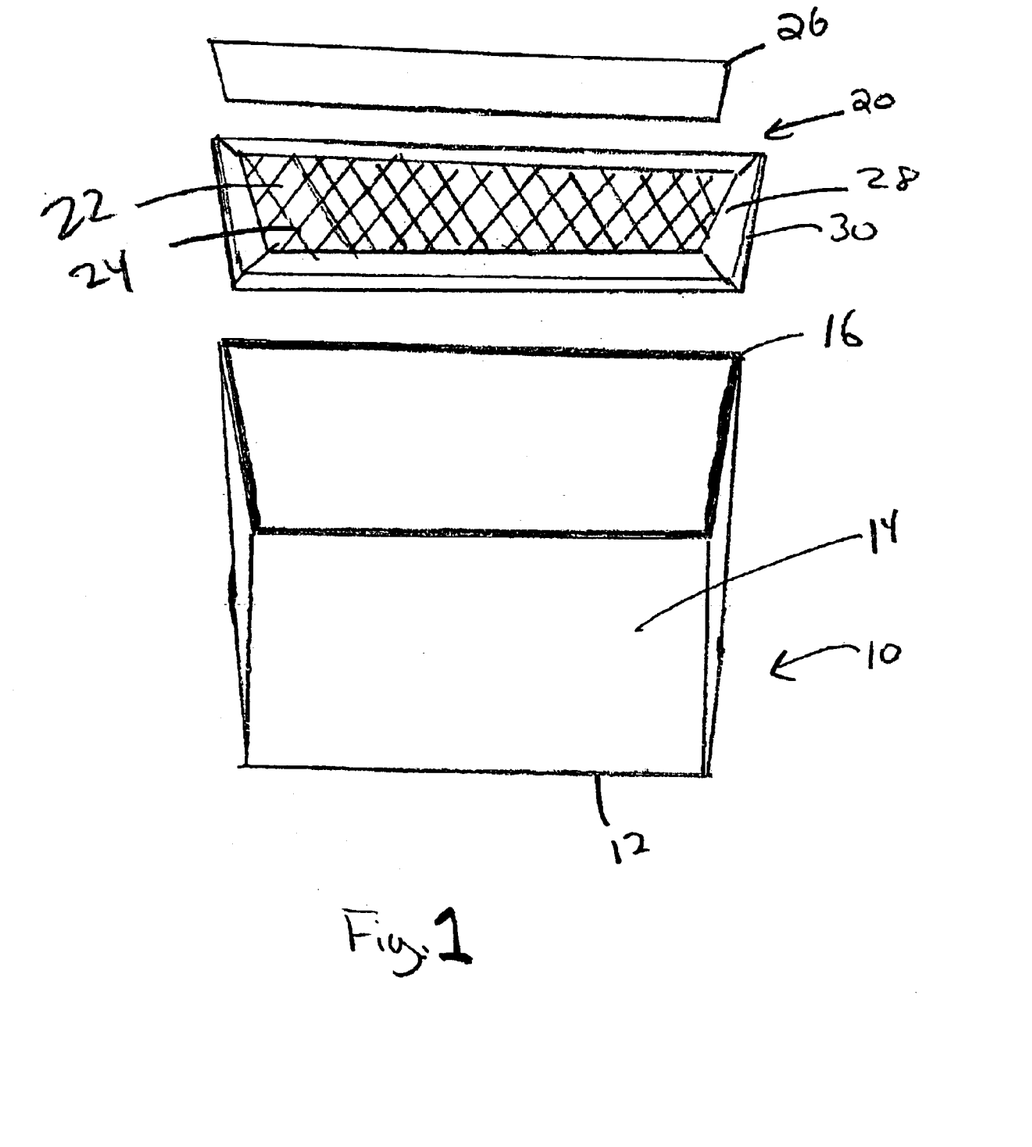
FIG. 1 illustrates a front elevation of an animal cage and filter bonnet, in accordance with one embodiment of the present invention.

As illustrated in FIG. 1, the present invention provides for an animal cage 10 configured to store animals. Cage 10 can be constructed of any material that is capable of containing animals such as metal (wire cage) or a plastic or polymer material. For the purposes of illustration cage 10 of the present invention relates to a plastic cage, however, this in no way intends to limit the scope of the present invention. Cage 10 is comprised of a base 12 and side walls 14. Each of side walls 14 have an upper portion or lip 16.

In one embodiment of the present invention, as illustrated in FIG. 1, cage 10 is provided with a filter bonnet 20. Filter bonnet 20 can be constructed of any material suitable for supporting an air filter for the top of cage 10. Filter bonnet 20 is constructed of a top opening portion 22 having a lattice support 24 for supporting an air filter 26. Filter bonnet side walls 28 corresponding to the geometric proportion of side walls 14 of cage 10, extend downwardly from top portion 22 to a flange portion 30 configured to rest on lip 16 of side walls 14.

It should be noted that the embodiment of cage 10 which includes filter bonnet 20 is for use with plastic cages 10. A seal is formed around the upper perimeter of sidewalls 14 between lip 16 and flange 30 of bonnet side walls 28 such that most air entering and leaving cage 10 passes through air filter 26 supported on lattice 24. This arrangement helps to prevent cross contamination between closely situated cages 10, particularly when cages 10 are being used to contain animals for scientific experimentation.

Figure 2A:
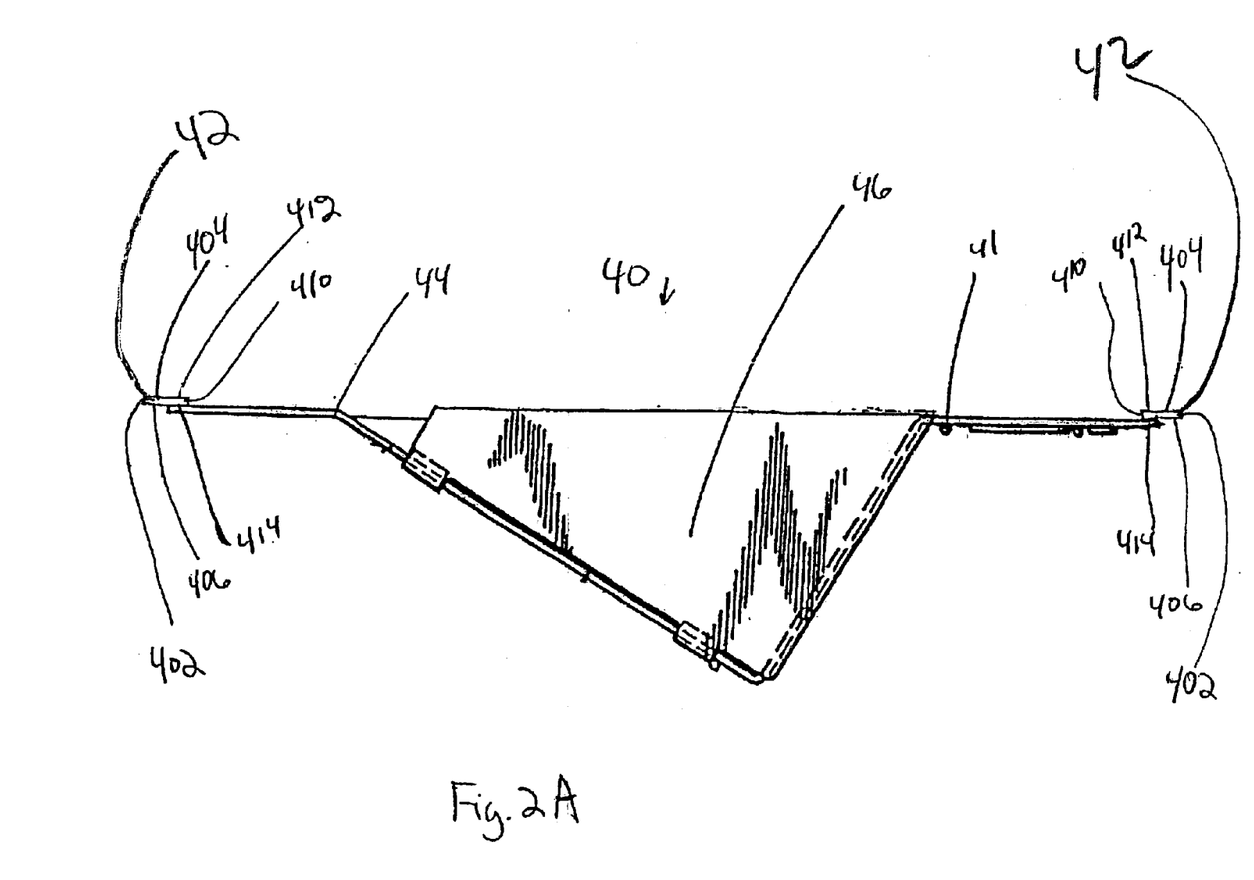
FIG. 2A illustrates a side elevation cross-section of a wire bar lid for an animal cage, in accordance with one embodiment of the present invention.

In one embodiment of the present invention, as illustrated in FIG. 2A, a wire bar lid 40 is mounted on cage 10 to provide means for supporting food and water for the animals stored in cage 10. Wire bar lid 40 is comprised of a perimeter portion 42, which is preferably constructed of a thin sheet metal piece which corresponds to the geometric proportions of lip 16 of cage 10.

Perimeter portion 42 is comprised of a support section 402, with a top side 404 and a bottom side 406, where at least a portion of bottom side 406 rests on lip 16 of cage 10. Perimeter portion 42 is further constructed of an inner portion 410, with a top side 412 and a bottom side 414 where at least a portion of bottom side 414 receives longitudinal wire bars 44.

Longitudinal wire bars 44 are directly attached to a portion of bottom side 414 of perimeter portion 42, and extend lengthwise from one side of perimeter 42 to the other. Longitudinal wire bars 44 are preferably parallel to side walls 14 of cage 10 and length portions of perimeter portion 42, and are preferably perpendicular to width portions of side walls 14 and perimeter portion 42. Longitudinal bars 44 are preferably evenly spaced across the width of wire bar lid 40.

When wire bar lid 40 is lowered into cage 10, bottom side 406 of support section 402 rests on lip 16 of side walls 14.

Longitudinal wire bars 44, attached to bottom side 414 of inner portion 410, extend across the opening at the top of cage 10 providing a means for storing food sniffs for the animals contained therein.

In one embodiment of the present invention, as illustrated in FIG. 2A, horizontal wire bars 41 are attached to the underside of longitudinal wire bars 44, and extend across perpendicular to the axis of longitudinal wire bars 44 from one side of perimeter 42 to the other. Horizontal wire bars 41 are preferably parallel to width portions of side walls 14 of cage 10 and of perimeter portion 42, perpendicular to length portions of side walls 14 and perimeter portion 42. Horizontal bars 41 are preferably spaced across the length of wire bar lid 40, configured to add structural strength to lid 40.

In one embodiment of the present invention, a food receiving area 46 is positioned in wire lid 40, configured to store food for the animals in cage 10. As longitudinal bars 44 extend across the length of perimeter portion 42, bars 44 bend downwardly toward the base of cage 10 for a given length and then bend back upwardly toward the plane of perimeter region 42 forming a food receiving area 46 in the shape of downward wedge. Because food receiving area 46 is formed by evenly spaced wire bars 44, animals in the cage can reach up and get the food between bars 44.

It should be noted that this configuration is in no way intended to limit the scope of the present invention. For example, longitudinal wire bars 44 do not have to be spaced evenly across the width of wire bar lid 40. Likewise, the shape of food receiving area 46 need not be in any particular shape so long as it is capable of performing the function of storing the food for the animals. Any configuration of wire bar lid 40 which is capable of performing the necessary functions of storing food for the animals is within the contemplation of the present invention.

Figure 2B:
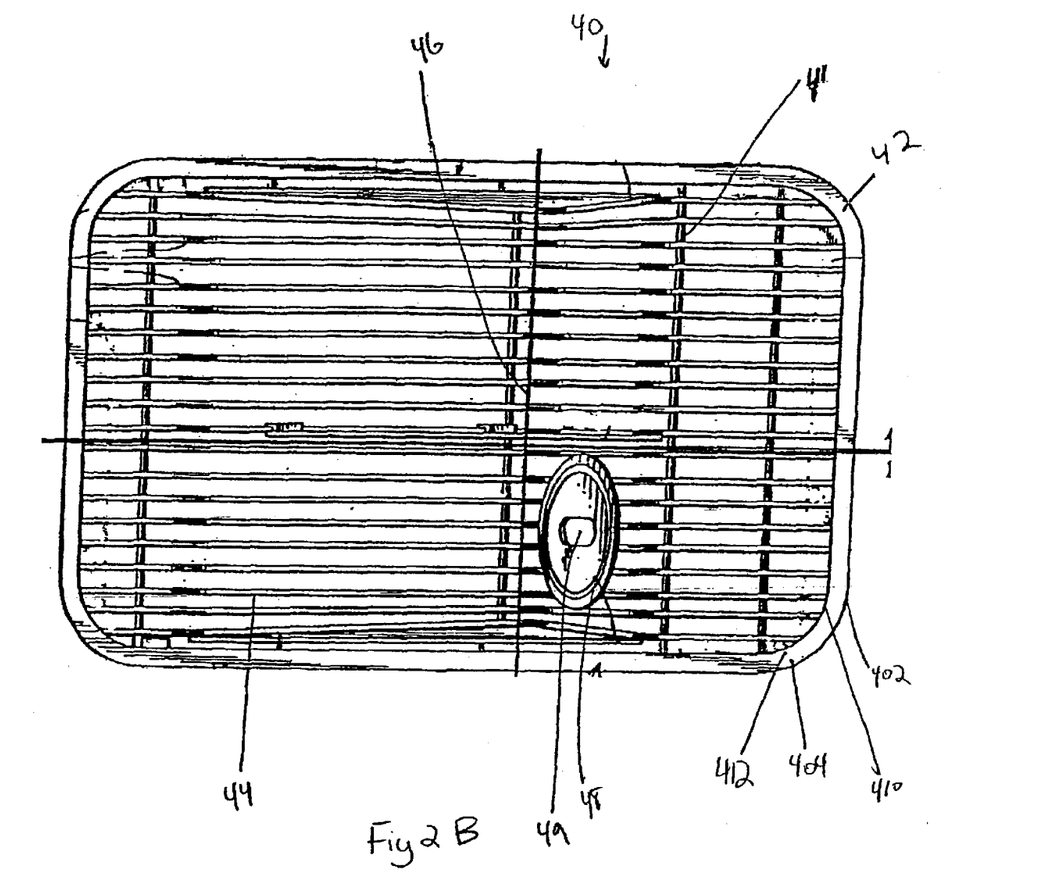
FIG. 2B illustrates a top view of a wire bar lid for an animal cage from FIG. 2A, in accordance with one embodiment of the present invention.

In one embodiment of the present invention, as illustrated in FIG. 2B, a water stop 48 is positioned in food receiving area 46 such that a water bottle can be rested against it and provide water to the animals in cage 10. A spout hole 49 in water stop 48 is configured to provide an opening through which a water spout can be lowered into cage 10 for the animals.

Figure 3:
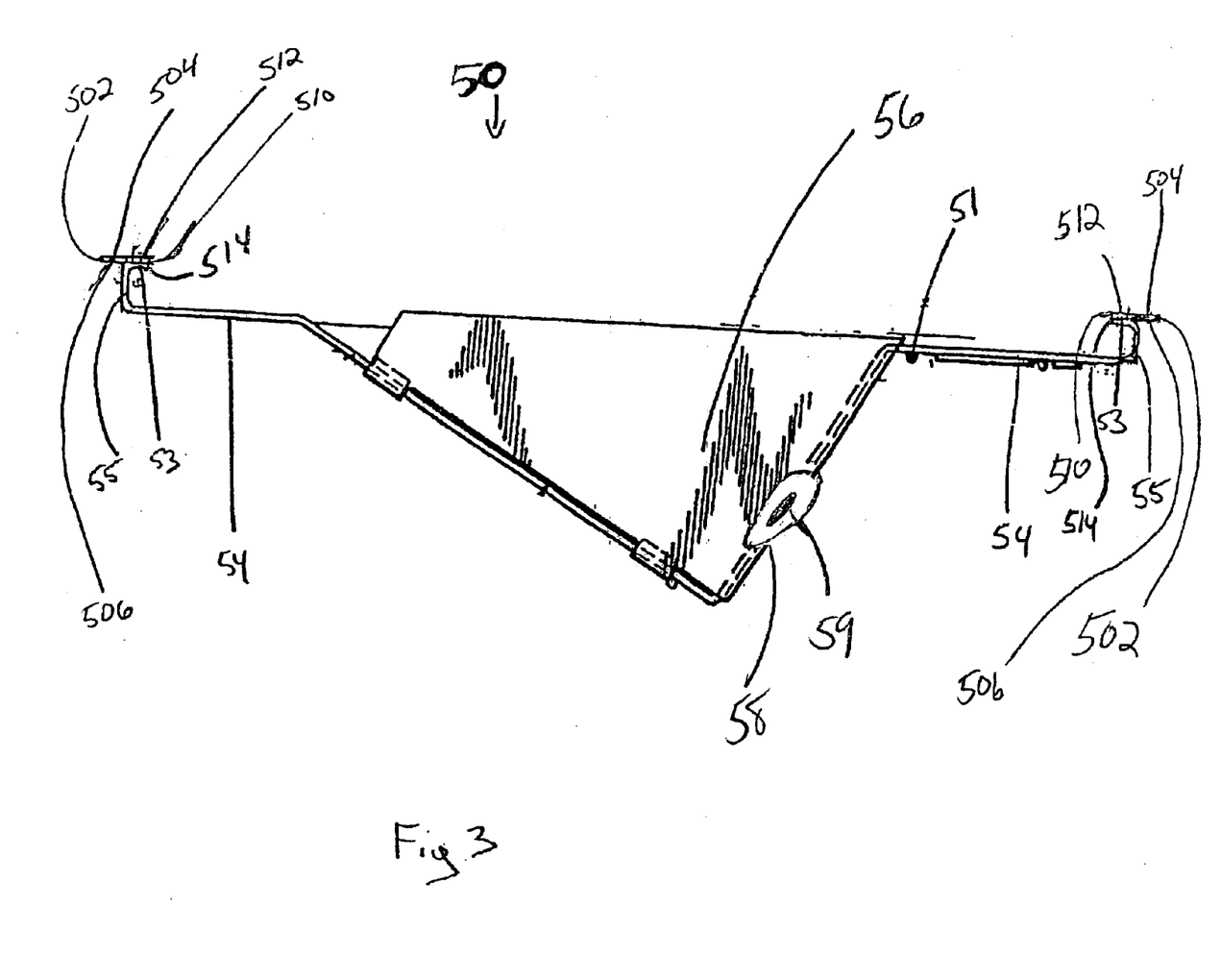
FIG. 3 illustrates a side elevation cross section of a wire bar lid for an animal cage, in accordance with another embodiment of the present invention.

In an another embodiment of the present invention, as illustrated in FIG. 3, a wire bar lid 50 is mounted on cage 10 to provide a means for supporting food and water for the animals stored in cage 10. Wire bar lid 50 is comprised of a perimeter portion 52, which is preferably constructed of a thin, flat sheet metal piece which corresponds to the geometric proportions of lip 16 of cage 10.

Perimeter portion 52 is comprised of a support section 502, with a top side 504 and a bottom side 506, where at least a portion of bottom side 506 rests on lip 16. Perimeter portion 52 is further constructed of an inner portion 510, with a top side 512 and a bottom side 514 where at least a portion of bottom side 514 receives longitudinal wire bars 54. Longitudinal wire bars 54, directly attached to bottom side 514 of perimeter portion 52.

As illustrated in FIG. 3, each wire bar 54 includes an attachment portion 53 attached to the bottom side 514 of perimeter portion 52, parallel to the plane of perimeter portion 52. Wire bars 54 also include an extension portion 55 extending downwardly, for example at a 90 degree angle, from attachment portion 53. Each wire bar 54 then bends, for example 90 degrees, back toward the middle of wire bar lid 50 and extend lengthwise from one side of perimeter 52 to the other. Longitudinal wire bars 54 are preferably parallel to side walls 14 of cage 10 and length portions of perimeter portion 52 and perpendicular to width portions of side walls 14 and perimeter portion 52. Longitudinal bars 54 are preferably evenly spaced across the width of wire bar lid 50.

When wire bar lid 50 is lowered into cage 10, bottom side 506 of support section 502 rests on lip 16 of side walls 14. Longitudinal wire bars 54, attached to bottom side 514 of inner portion 510, extend across the opening at the top of cage 10 providing a means for storing food stuffs for the animals contained therein.

In one embodiment of the present invention, as illustrated in FIG. 3, horizontal wire bars 51 are attached to the underside of longitudinal wire bars 54, and extend across perpendicular to the axis of longitudinal wire bars 54 from one side of perimeter 52 to the other. Horizontal wire bars 51 are preferably parallel to width portions of side walls 14 of cage 10 and of perimeter portion 52, perpendicular to length portions of side walls 14 and perimeter portion 52. Horizontal bars 51 are preferably spaced across the length of wire bar lid 50, configured to add structural strength to lid 50.

In one embodiment of the present invention, a food receiving area 56 is positioned in wire lid 50 configured to store food for the animals in cage 10. As longitudinal bars 54 extend across the length of perimeter portion 52, bars 54 bend downwardly toward the base of cage 10 for a given length and then bend back upwardly toward the plane of perimeter region 52 forming a food receiving area 56 in the shape of downward wedge. Because food receiving area 56 is formed by evenly spaced wire bars 54, animals in the cage can reach up and get the food between bars 54. This embodiment, maintaining the extension portion 55 of wire lid 50, is configured such that it can be used with deeper cages having taller side walls 14 and still allowing for smaller animals to reach the food in food receiving area 56.

It should be noted that this configuration is in no way intended to limit the scope of the present invention. For example, longitudinal wire bars 54 do not have to be spaced evenly across the width of wire bar lid 50. Likewise, the shape of food receiving area 56 need not be in any particular shape so long as it is capable of performing the function of storing the food for the animals. Any configuration of wire bar lid 50 which is capable of performing the necessary functions of storing food for the animals is within the contemplation of the present invention.

In another embodiment of the present invention, a water stop 58, is positioned in food receiving area 56 such that a water bottle can be rested against it and provide water to the animals in cage 10. A spout hole 59 in water stop 58 is configured to provide an opening through which a water spout can be lowered into cage 10 for the animals.

Figure 4:
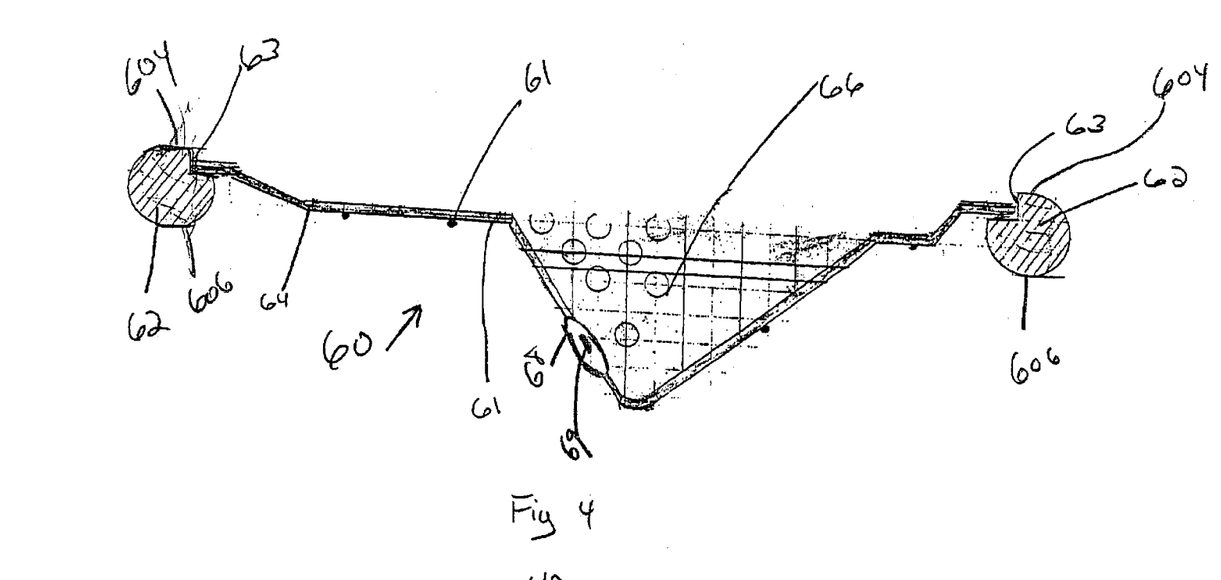
FIG. 4 illustrates a side elevation cross-section of a wire bar lid for an animal cage, in accordance with another embodiment of the present invention.

In still another embodiment of the present invention as illustrated in FIG. 4, a wire bar lid 60 is mounted on cage 10 to provide means for supporting food and water for the animals stored in cage 10. Wire bar lid 60 is comprised of a perimeter portion 62, which is preferably constructed of a continuous cylindrical metal tube which corresponds to the geometric proportions of lip 16 of cage 10. Perimeter portion 62 is comprised of a top side 604 and a bottom side 606, where at least a portion of bottom side 606 rests on lip 16 of cage 10.

Longitudinal wire bars 64 are directly attached to a wire bar notch 63 of perimeter portion 62, and extend lengthwise from one side of perimeter 62 to the other. Longitudinal wire bars 64 are preferably parallel to side walls 14 of cage 10 and length portions of perimeter portion 62 of wire bar lid 60 and perpendicular to width portions of side walls 14 and perimeter portion 62. Longitudinal bars 64 are preferably evenly spaced across the width of wire bar lid 60.

When wire bar lid 60 is lowered into cage 10, bottom side 606 of perimeter portion 62 rests on lip 16 of side walls 14. Longitudinal wire bars 64, attached to wire bar notch 63 and extend across the opening at the top of cage 10 providing a means for storing food stuffs for the animals contained therein.

In one embodiment of the present invention, as illustrated in FIG. 4, horizontal wire bars 61 are attached to the underside of longitudinal wire bars 64, and extend across perpendicular to the axis of longitudinal wire bars 64 from one side of perimeter 62 to the other. Horizontal wire bars 61 are preferably parallel to width portions of side walls 14 of cage 10 and of perimeter portion 62, perpendicular to length portions of side walls 14 and perimeter portion 62. Horizontal bars 61 are preferably spaced across the length of wire bar lid 60, configured to add structural strength to lid 60.

Figure 5:
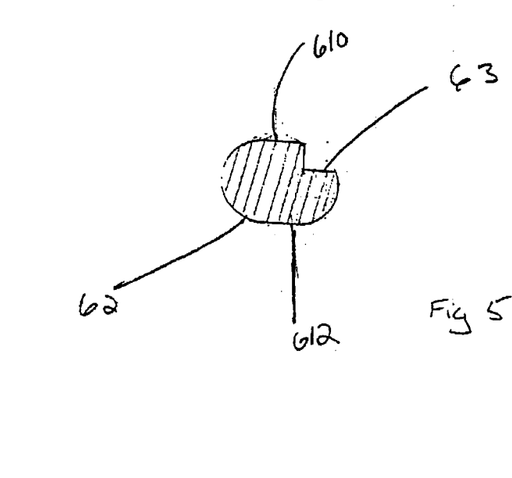
FIG. 5 illustrates a side elevation cross-section of a perimeter portion of a wire bar lid from FIG. 4, in accordance with one embodiment of the present invention.
Figure 9:
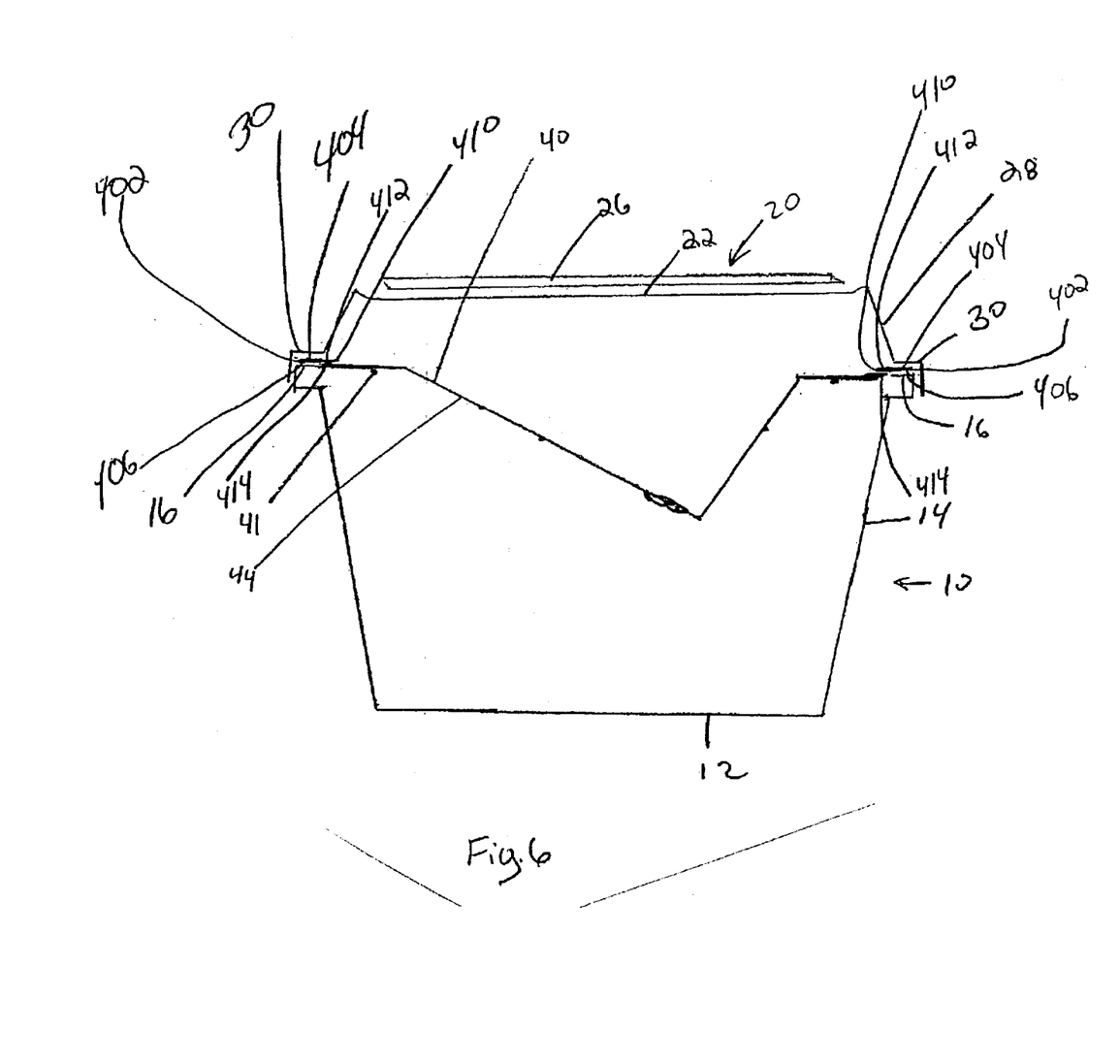

It should be noted that the continuous cylindrical metal tube shape of perimeter portion 62, is intended only as an exemplary shape and is no way intended to limit the scope of the present invention. Any similar non-cylindrical shape is also within the contemplation of the present invention. For example, as illustrated in FIG. 5, perimeter portion 62 can be formed in a semi-ovular shape having a top side 610 and a bottom side 612.

In one embodiment of the present invention, a food receiving area 66 is positioned in wire lid 60 configured to store food for the animals in cage 10. As longitudinal bars 64 extend across the length of perimeter portion 62, bars 64 bend downwardly toward the base of cage 10 for a given length and then bend back upwardly toward the plane of perimeter region 62 forming a food receiving area 66 in the shape of downward wedge. Because food receiving area 66 is formed by evenly spaced wire bars 64, animals in the cage can reach up and get the food between the bars 64.

It should be noted that this configuration is in no way intended to limit the scope of the present invention. For example, longitudinal wire bars 64 do not have to be spaced evenly across the width of wire bar lid 60. Likewise, the shape of food receiving area 66 need not be in any particular shape so long as it is capable of performing the function of storing the food for the animals. Any configuration of wire bar lid 60 which is capable of performing the necessary functions of storing food for the animals is within the contemplation of the present invention.

In one embodiment of the present invention, as illustrated in FIG. 4, a water stop 68, is positioned in food receiving area 66 such that a water bottle can be rested against it and provide water to the animals in cage 10. A spout hole 69 in water stop 68 is configured to provide an opening through which a water spout can be lowered into cage 10 for the animals.

In each of the three wire bar lids 40, 50 and 60 the simplified construction greatly reduces the construction cost, particularly in view of the mass production techniques used, by reducing the amount of procedures necessary to create lids 40, 50 and 60. In all three wire bar lids 40, 50 and 60, longitudinal wire bars 44, 54 and 64 are fixed to perimeter portion 42, 52 and 62 respectively in a single procedure such as welding. This reduction of production steps allows wire bar lids 40, 50 and 60 to be constructed more quickly and inexpensively than standard wire bar lids.

It should be noted that any of the three forms of wire lid 40, 50 or 60 can be used interchangeably with cage 10 and filter bonnet 20 based on the particular requirements necessary for the animals being stored in the cages. For the purposes of illustration, wire bar lid 40 will be used to demonstrate the construction of cage 10 into its operational form.

In one embodiment of the present invention, as illustrated in FIGS. 1 and 6, bottom side 406 of support portion 402 is lowered onto lip 16 of cage 10. After wire bar lid 40 is in place in cage 10, flange 30 of filter bonnet 20, illustrated in FIG. 1, is rested upon top side 404 of support portion 402, providing an animal cage of inexpensive construction, that is easy to clean and provides a sterile environment for conducting animal experiments.

In this configuration, a completed cage 10 is provided with a filter bonnet 20, cage 10 and wire bar lid 40. The meeting point between lip 16 and bottom side 406, and flange 30 and top side 404 form a sealed animal cage 10 which is easily to clean and provides limited space for contaminants to collect. Because lip 16, meets directly with a flat bottom side 406 of perimeter 42 and flange 30 meets directly with a flat top side 404 of perimeter portion 42 there are no spaces for contaminants to collect such as food particles or dirt assisting in maintaining a sterile atmosphere for the cages used in experimentation and making cages 10 easy to clean.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. An animal cage comprised of:
   a cage for containing animals; and
   a wire bar lid configured to fit on top of said cage, said wire bar lid having a perimeter portion having a first support portion and a second inner portion, said first support portion having a first top side and a first bottom side, said second inner portion having a second top side and a second bottom side; and
   a plurality of longitudinal wire bars wherein said longitudinal wire bars are connected directly to said second bottom side of said second inner portion of said perimeter portion in a single welding procedure.

2. The animal cage as claimed in claim 1, wherein said cage is constructed of plastic.

3. The animal cage as claimed in claim 1, wherein said cage further comprises side walls, said side walls having lips disposed thereon, wherein said lips are further configured to support at least a portion of said first bottom side of said first support portion of said perimeter portion of said wire bar lid.

4. The animal cage as claimed in claim 1, further comprising a filter bonnet having a flange, wherein said flange is configured to rest on said first top side of said first support portion of said perimeter portion of said wire bar lid so as to support said filter bonnet.

5. The animal cage as claimed in claim 1, wherein said wire bar lid further comprises horizontal wire bars attached to the underside of said longitudinal wire bars configured to add stability to said wire bar lid.

6. The animal cage as claimed in claim 1, wherein said wire bar lid further comprises a food receiving area configured to store food accessible to animals stored in said cage without removing said wire bar lid.

7. The animal cage as claimed in claim 1, wherein said wire bar lid further comprises a water stop having a spout hole disposed therein, said water stop supported by said longitudinal wire bars in said food receiving area.

8. The animal cage as claimed in claim 1, wherein said first support portion and said second inner portion of said perimeter portion is comprises a thin flat metal element.

9. The animal cage as claimed in claim 8, wherein said longitudinal wire bars further comprise an attachment portion attached to said second bottom side of said second inner portion of said perimeter portion of said wire bar lid.

10. The animal cage as claimed in claim 9, wherein said longitudinal wire bars further comprise an extension portion extending downwardly from said attachment portion so as to lower said longitudinal wire bars below the plane of said perimeter portion.

11. The animal cage as claimed in claim 10, wherein said extension portion extends downwardly at a 90 degree angle from said attachment portion.

12. The animal cage as claimed in claim 1, wherein said perimeter portion of said wire bar lid is a continuous cylindrical metal tube.

13. The animal cage as claimed in claim 12, wherein said cylindrical metal tube maintains a wire bar notch for attaching said longitudinal wire bars.

14. The animal cage as claimed in claim 1, wherein said perimeter portion of said wire bar lid is a continuous ovular metal tube.

15. The animal cage as claimed in claim 14, wherein said ovular metal tube maintains a wire bar notch for attaching said longitudinal wire bars.

16. The animal cage as claimed in claim 1, wherein said longitudinal wire bars are welded to said perimeter portion by electric arc welding.

17. An animal cage comprised of:
a cage for containing animals; and
a wire bar lid configured to fit on top of said cage, said wire bar lid having a perimeter portion having a first support portion and a second inner portion, said first support portion having a first top side and a first bottom side, said second inner portion having a second top side and a second bottom side; and
a plurality of longitudinal wire bars, said longitudinal wire bars having an attachment portion and an extension portion, wherein said attachment portion of said longitudinal wire bars are connected directly to said second bottom side of said second inner portion of said perimeter portion in a single welding procedure, said extension portion of said longitudinal wire bars extending downwardly from said attachment portion.

18. The animal cage as claimed in claim 17, wherein said extension portion extends downwardly from said attachment portion at a 90 degree angle.

19. The animal cage as claimed in claim 17, wherein said cage further comprises side walls, said side walls having lips disposed thereon, wherein said lips are further configured to support at least a portion of said first lower side of said first support portion of said perimeter portion of said wire bar lid.

20. The animal cage as claimed in claim 17, wherein said wire bar lid further comprises a water stop having a spout hole disposed therein, said water stop supported by said longitudinal wire bars in said food receiving area.

21. An animal cage comprised of:
a cage for containing animals; and
a wire bar lid configured to fit on top of said cage, said wire bar lid having a rounded metal wire perimeter portion having a first top side, a first bottom side and a wire bar notch, and a plurality of longitudinal wire bars wherein said longitudinal wire bars are connected directly to said wire bar notch of said rounded metal wire perimeter portion.

22. The cage as claimed in claim 21, wherein said rounded metal wire perimeter portion is cylindrical.

23. The cage as claimed in claim 21, wherein said rounded metal wire perimeter portion is ovular.

24. The animal cage as claimed in claim 21, wherein said cage further comprises side walls, said side walls having lips disposed thereon, wherein said lips are further configured to support at least a portion of said bottom side of said rounded wire perimeter portion of said wire bar lid.

25. The animal cage as claimed in claim 21, wherein said wire bar lid further comprises a water stop having a spout hole disposed therein, said water stop supported by said longitudinal wire bars in said food receiving area.

26. A wire bar lid for use with a cage, said wire bar lid comprised of:
a perimeter portion having a first support portion and a second inner portion, said first support portion having a first top side and a first bottom side, said second inner portion having a second top side and a second bottom side; and
a plurality of longitudinal wire bars wherein said longitudinal wire bars are connected directly to said second bottom side of said second inner portion of said perimeter portion in a single welding procedure.

27. The wire bar lid as claimed in claim 26, wherein said wire bar lid further comprises horizontal wire bars attached to the underside of said longitudinal wire bars configured to add stability to said wire bar lid.

28. The wire bar lid as claimed in claim 26, wherein said wire bar lid further comprises a food receiving area configured to store food accessible to animals stored in said cage without removing said wire bar lid.

29. The wire bar lid as claimed in claim 26, wherein said wire bar lid further comprises a water stop having a spout hole disposed therein, said water stop supported by said longitudinal wire bars in said food receiving area.

30. The wire bar lid as claimed in claim 26, wherein said first support portion and said second inner portion of said perimeter portion is comprises a thin flat metal element.

31. The wire bar lid as claimed in claim 30, wherein said longitudinal wire bars further comprise an attachment portion attached to said second bottom side of said second inner portion of said perimeter portion of said wire bar lid.

32. The wire bar lid as claimed in claim 31, wherein said longitudinal wire bars further comprise an extension portion extending downwardly from said attachment portion so as to lower said longitudinal wire bars below the plane of said perimeter portion.

33. The wire bar lid as claimed in claim 32, wherein said extension portion extends downwardly at a 90 degree angle from said attachment portion.

34. The wire bar lid as claimed in claim 26, wherein said perimeter portion of said wire bar lid is a continuous cylindrical metal tube.

35. The wire bar lid as claimed in claim 34, wherein said cylindrical metal tube maintains a wire bar notch for attaching said longitudinal wire bars.

36. The wire bar lid as claimed in claim 26, wherein said perimeter portion of said wire bar lid is a continuous ovular metal tube.

37. The wire bar lid as claimed in claim 36, wherein said ovular metal tube maintains a wire bar notch for attaching said longitudinal wire bars.

38. The wire bar lid as claimed in claim 26, wherein said longitudinal wire bars are welded to said perimeter portion by electric arc welding.

39. A wire bar lid for use with a cage, said wire bar lid comprising:

a perimeter portion having a first support portion and a second inner portion, said first support portion having a first top side and a first bottom side, said second inner portion having a second top side and a second bottom side; and a plurality of longitudinal wire bars, said longitudinal wire bars having an attachment portion and an extension portion, wherein said attachment portion of said longitudinal wire bars are connected directly to said second bottom side of said second inner portion of said perimeter portion in a single welding procedure, said extension portion of said longitudinal wire bars extending downwardly from said attachment portion.

40. The wire bar lid as claimed in claim 39, wherein said extension portion extends downwardly from said attachment portion at a 90 degree angle.

41. The wire bar lid as claimed in claim 39, wherein said cage further comprises side walls, said side walls having lips disposed thereon, wherein said lips are further configured to support at least a portion of said first lower side of said first support portion of said perimeter portion of said wire bar lid.

42. The wire bar lid as claimed in claim 39, wherein said wire bar lid further comprises a water stop having a spout hole disposed therein, said water stop supported by said longitudinal wire bars in said food receiving area.

43. A wire bar lid for use with a cage, said wire bar lid comprising:

a rounded metal wire perimeter portion having a first top side, a first bottom side and a wire bar notch, and a plurality of longitudinal wire bars wherein said longitudinal wire bars are connected directly to said wire bar notch of said rounded metal wire perimeter portion.

* * * * *